(12) United States Patent
Pic et al.

(10) Patent No.: US 12,533,140 B2
(45) Date of Patent: Jan. 27, 2026

(54) COLLET DEPLOYABLE HEMOSTASIS CLIP

(71) Applicant: BOSTON SCIENTIFIC SCIMED, INC., Maple Grove, MN (US)

(72) Inventors: Andrew Pic, Northborough, MA (US); Joseph W. King, Franklin, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 776 days.

(21) Appl. No.: 17/812,084

(22) Filed: Jul. 12, 2022

(65) Prior Publication Data

US 2023/0071943 A1 Mar. 9, 2023

Related U.S. Application Data

(60) Provisional application No. 63/261,046, filed on Sep. 9, 2021.

(51) Int. Cl.
*A61B 17/122* (2006.01)
*A61B 17/00* (2006.01)
*A61B 17/12* (2006.01)

(52) U.S. Cl.
CPC ............ *A61B 17/1227* (2013.01); *A61B 2017/00818* (2013.01); *A61B 2017/12004* (2013.01)

(58) Field of Classification Search
CPC ...... A61B 17/1227; A61B 2017/00818; A61B 2017/12004; A61B 17/1285
See application file for complete search history.

(56) References Cited

U.S. PATENT DOCUMENTS

| 2004/0049207 A1* | 3/2004 | Goldfarb ............ A61B 17/1227 606/139 |
| 2005/0070758 A1* | 3/2005 | Wells ................. A61B 17/1285 600/104 |
| 2006/0271072 A1* | 11/2006 | Hummel ............ A61B 17/1285 606/142 |
| 2007/0282355 A1* | 12/2007 | Brown ................. A61B 17/122 606/151 |
| 2011/0196390 A1 | 8/2011 | Kogiso et al. |
| 2012/0041455 A1 | 2/2012 | Martinez |
| 2018/0153552 A1 | 6/2018 | King et al. |
| 2020/0113572 A1 | 4/2020 | Tsuchiya et al. |

FOREIGN PATENT DOCUMENTS

| JP | 2004-500206 | 1/2004 |
| WO | 01/66001 | 9/2001 |
| WO | 2021/015902 | 1/2021 |

* cited by examiner

*Primary Examiner* — Erin Mcgrath
(74) *Attorney, Agent, or Firm* — Fay Kaplun & Marcin, LLP

(57) ABSTRACT

A clipping system includes a device including longitudinal slots extending through a wall thereof and a clip releasably received within a distal portion of the device. The clip includes a capsule and a pair of clip arms. Proximal ends of the arms are slidably received within the capsule and a collet is slidably mounted over the device movable between an insertion configuration, in which the collet is positioned over the distal portion of the device pressing the distal portion against the capsule and a deployed configuration, in which the collet is proximal of the distal portion so that the clip is releasable from the device. A control member extends through the channel of the device to couple to the proximal ends of the arms and a portion of the collet. Movement of the member opens and closes the clip and moves the collet between the insertion and deployed configurations.

15 Claims, 5 Drawing Sheets

COLLET DEPLOYABLE HEMOSTASIS CLIP

PRIORITY CLAIM

The present disclosure claims priority to U.S. Provisional Patent Application Ser. No. 63/261,046 filed Sep. 9, 2021; the disclosure of which is incorporated herewith by reference.

FIELD

The present disclosure relates to endoscopic devices and, in particular, relates to endoscopic clipping devices for treating tissue along the gastrointestinal tract.

BACKGROUND

Physicians have become more willing to perform aggressive interventional and therapeutic endoscopic gastrointestinal (GI) procedures, which may increase the risk of perforating the wall of the GI tract or may require closure of the GI tract wall as part of the procedure. Such procedures may include, for example, the removal of large lesions, tunneling under the mucosal layer of the GI tract to treat issues below the mucosa, full thickness removal of tissue, treatment of issues on other organs by passing outside of the GI tract, and endoscopic treatment/repair of post-surgical issues (e.g., post-surgical leaks, breakdown of surgical staple lines, and anastomotic leaks). Currently, tissue may be treated via endoscope closure devices such as, for example, hemostasis clips inserted through an endoscope. Depending on the size of the defect, multiple clips may be required. In some cases, however, current endoscopic closure devices may be difficult to use, time consuming to position, or insufficient for certain perforations, conditions and anatomies.

SUMMARY

The present disclosure relates to a clipping system for treating tissue. The system includes an insertion device extending longitudinally from a proximal end to a distal end and including a channel extending therethrough, the insertion device including a plurality of longitudinal slots extending through a wall thereof and along a distal portion thereof such that the longitudinal slots are open to the channel and the distal end of the insertion device. The system also includes a clip releasably received within the distal portion of the insertion device, the clip including a capsule extending longitudinally from a proximal end to a distal end and including a channel extending therethrough, and a pair of clip arms, proximal ends of which are slidably received within the channel of the capsule to move the clip arms between an open configuration, in which distal ends thereof are separated from one another to receive a tissue therebetween, and a closed configuration, in which the distal ends are drawn toward one another to grip tissue therebetween The system further includes a collet slidably mounted over the insertion device and movable between an insertion configuration, in which the collet is positioned over the distal portion of the insertion device to press the distal portion against the capsule and to hold the capsule therein, and a deployed configuration, in which the collet is proximal the distal portion so that the clip is releasably from the distal portion of the insertion device. Furthermore, the system includes a control member extending through the channel of the insertion device to be coupled to the proximal ends of the clip arms and a portion of the collet so that movement of the clip between the open and closed configurations and movement of the collet between the insertion configuration and the deployed configuration is controlled via a longitudinal movement of the control member relative to the insertion device.

In an embodiment, the system further includes a yoke coupling the control member to the clip arms and the collet, the yoke including a distal portion connected to the clip arms and a proximal portion connected to a portion of the collet, the distal and proximal portions of the yoke connected to one another via a separable connection that is configured to separate when subject to a predetermined force exceeding a predetermined threshold value.

In an embodiment, the distal portion is received between the proximal ends of the clip arms and include protrusions extending from opposing sides thereof, the protrusions received within openings extending through a proximal portion of the clip arms.

In an embodiment, the proximal portion houses a distal end of the control member therein and includes a longitudinal groove extending therealong, an engaging tab of the collet extending into the channel of the insertion to be slidably received within the longitudinal groove.

In an embodiment, a length of the longitudinal groove corresponds to a distance via which the control member is moved relative to the insertion device during a movement of the clip between the open and the closed configurations.

In an embodiment, the proximal ends of the clip arms are biased radially outward and include locking structures extending laterally therefrom so that, when the proximal ends of the clip arms are moved proximally of the proximal end of the capsule, the locking structures engage a proximal edge of the capsule to lock the clip in the closed configuration.

In an embodiment, the clip arms include engaging features configured to engage portion of the capsule such that, when the engaging features engage the capsule, the clip arms are prevented from moving further proximally relative to capsule and the predetermined force is exerted on the distal end of the control member.

In an embodiment, the distal ends of the clip arms are biased toward the open configuration so that, when the clip arms are drawn into the capsule, the clip arms are constrained toward the closed configuration via an interior surface of the capsule and, when the clip arms are moved distally out of the capsule, the clip arms are permitted to revert to their biased open configuration.

In an embodiment, the capsule is keyed to the insertion device so that a rotation of the insertion device correspondingly rotates the clip.

In an embodiment, the insertion device is keyed to the collet so that a rotation of the insertion device correspondingly rotates the collet and the clip.

In an embodiment, the insertion device further includes a crimp tab positioned immediately distal a proximal end of the collet when the collet is in the insertion configuration and extending into the channel of the insertion device, the crimp tab deformable to permit the collet to move proximally therepast when subject to a predetermined force exceeding a predetermined threshold value via the collet.

The present disclosure also relates to a clipping system which includes a catheter extending longitudinally from a proximal end to a distal end and including a channel extending therethrough, the catheter including a plurality of longitudinal slots extending through a wall thereof from the distal end along a distal portion of the catheter; a clip including a capsule extending longitudinally from a proximal end to a distal end and including a channel extending therethrough, and a pair of clip arms, proximal ends of which are slidably received within the channel of the capsule to move the clip arms between an open configuration and a closed configuration, the capsule of the clip configured to be releasably received within the distal portion of the catheter; a collet slidably mounted over the catheter and movable between an insertion configuration, in which the collet is positioned over the distal portion of the catheter to press the distal portion against the capsule and to hold the capsule therein, and a deployed configuration, in which the collet is proximal the distal portion so that the clip is releasably from the distal portion of the catheter; and a control member connected to the clip arms and the collet via a yoke, the yoke including a distal portion connected to the clip arms and a proximal portion connected to a portion of the collet, the distal and proximal portions of the yoke connected to one another via a separable connection that is configured to separate when subject to a predetermined force exceeding a predetermined threshold value.

In an embodiment, the proximal portion houses an enlarged distal end of the control member therein and includes a longitudinal groove extending therealong, an engaging tab of the collet extending into the channel of the insertion to be slidably received within the longitudinal groove.

In an embodiment, the proximal ends of the clip arms are biased radially outward and include locking structures extending laterally therefrom so that, when the proximal ends of the clip arms are moved proximally of the proximal end of the capsule, the locking structures engage a proximal edge of the capsule to lock the clip in the closed configuration.

In an embodiment, the clip arms include engaging features configured to engage portion of the capsule such that, when the engaging features engage the capsule, the clip arms are prevented from moving further proximally relative to capsule and the predetermined force is exerted on the distal end of the control member.

In addition, the present disclosure relates to a method for treating target tissue. The method includes inserting a clip through a working channel of an endoscope to a target site within a body via a catheter, the clip inserted through the endoscope in an insertion configuration in which the clip is received within a distal portion of the catheter and held therein via a collet mounted thereover, the clip including a capsule and a pair of clip arms slidably received therein; moving the clip between an open configuration and a closed configuration via a control member coupled to the clip arms until selected target tissue is received between distal ends of the clip arms, the clip arms coupled to the control member via a yoke; drawing the clip arms further proximally into the capsule until locking tabs at proximal ends of the clip arms engage a portion of the capsule to lock the clip arms in the closed configuration; and deploying the clip from the catheter by drawing the collet proximally relative to the catheter via the control member until the collet is proximal the distal portion and the clip is releasably therefrom, a portion of the collet slidably coupled to the yoke.

In an embodiment, the deploying the clip includes drawing the control member proximally relative to the catheter until the yoke connecting the control member to the clip is subject to a predetermined force exceeding a predetermined threshold value so that a proximal portion of the yoke connected to a distal end of the control member is separated from a distal portion of the yoke connected to the clip arms.

In an embodiment, the moving the clip between the open configuration and the closed configuration causes an engaging portion of the collet to be slid within a longitudinal groove extending along the proximal portion of the yoke.

In an embodiment, the proximal and distal portions of the yoke are separated from one another when engaging features of the clip arms engage a portion of the capsule to prevent the clip arms from moving further proximally relative to capsule while the control member is moved further proximally relative to the catheter.

In an embodiment, the deploying the clip includes drawing the control member proximally relative to the catheter so that the collet is pressed proximally against a crimp tab of the catheter until tab to permit the collet to be moved proximally therepast.

DETAILED DESCRIPTION

Figure 1:
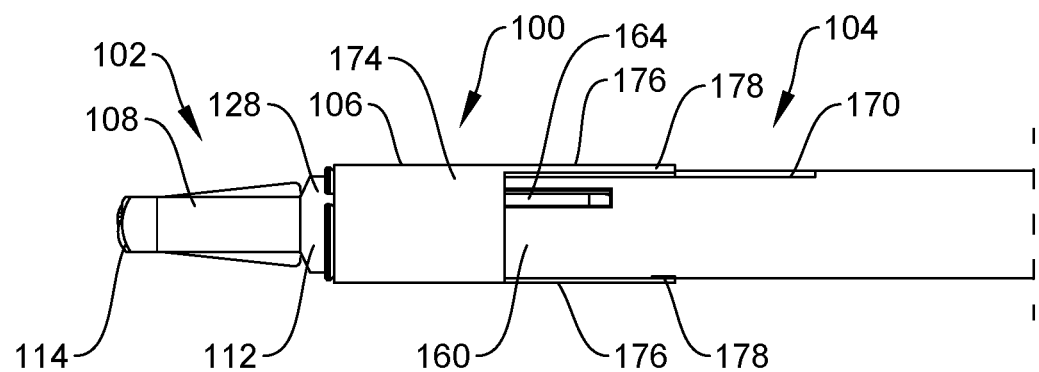
FIG. 1 shows a longitudinal side view of a clipping system according to an exemplary embodiment of the present disclosure, in an insertion configuration.

The present disclosure may be further understood with reference to the following description and the appended drawings, wherein like elements are referred to with the same reference numerals. The present disclosure is directed to an endoscopic clipping system for treating, for example, internal tissue perforations, defects and/or bleeds. Exemplary embodiments of the present disclosure describe a clipping system comprising a clip releasably coupled to a catheter via a collet that is slidable relative to the catheter to deploy the clip. The collet coupling minimizes the possibility of the clip being inadvertently reengaged with the catheter during or after deployment, while also allowing for a deployed clip that is shortened compared to most current clips which include a joint at a proximal end of the clip that couples the clip to the catheter. A shorter deployed clip may improve visualization of a target site and allow better maneuverability when placing multiple clips.

A yoke of the deployment mechanism according to the exemplary embodiment includes a proximal portion configured to break and/or separate from a distal portion of the yoke so that the proximal portion, which is connected to both the distal end of a control member and a proximal end of the collet, is entirely separated and removed from the deployed clip during deployment and then removed from the body, to eliminate any shed parts. Some current clip designs create shed parts during the process of separating the clip from the catheter which shed parts are left in the body after the procedure has been completed. As larger defect cases such as Peroral Endoscopic Myotomy (POEM) and Endoscopic Submucosal Dissection (ESD) become more prevalent, physicians may prefer clips that do not generate shed parts that may become embedded in tissue defects. It will be understood by those of skill in the art that the terms proximal and distal as used herein, are intended to refer to a direction toward and away from, respectively, a user of the system.

Figure 2:
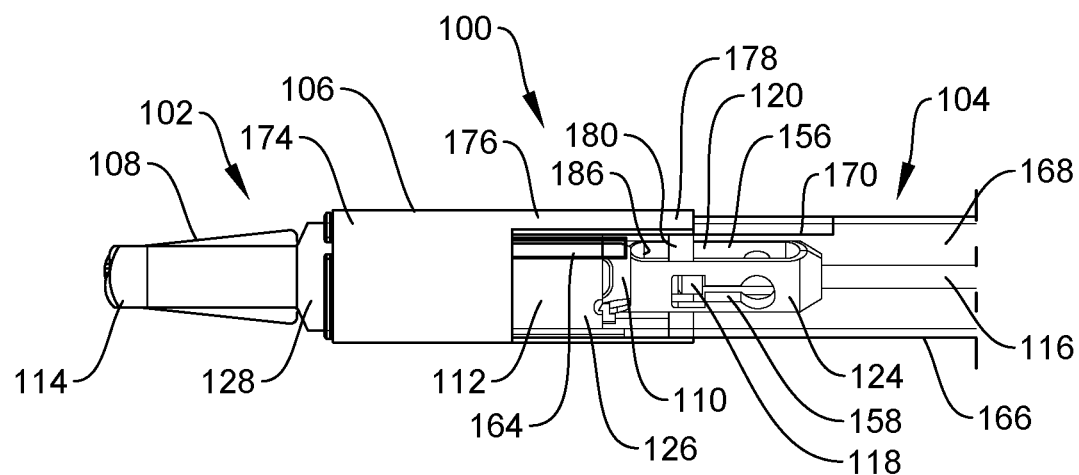
FIG. 2 shows a partially transparent longitudinal side view of the system of FIG. 1, in the insertion configuration.
Figure 3:
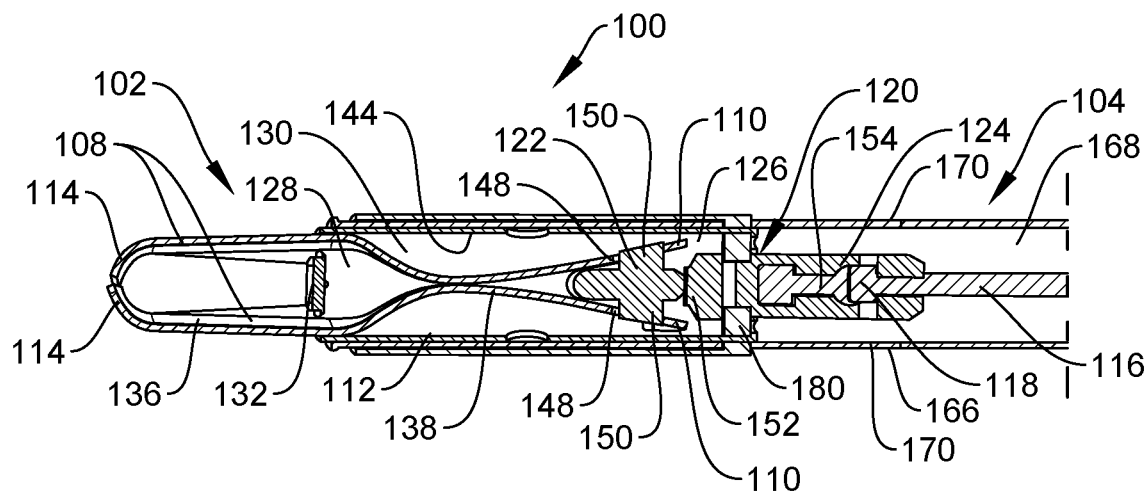
FIG. 3 shows a longitudinal cross-sectional side view of the of the system of FIG. 1, in the insertion configuration.
Figure 4:
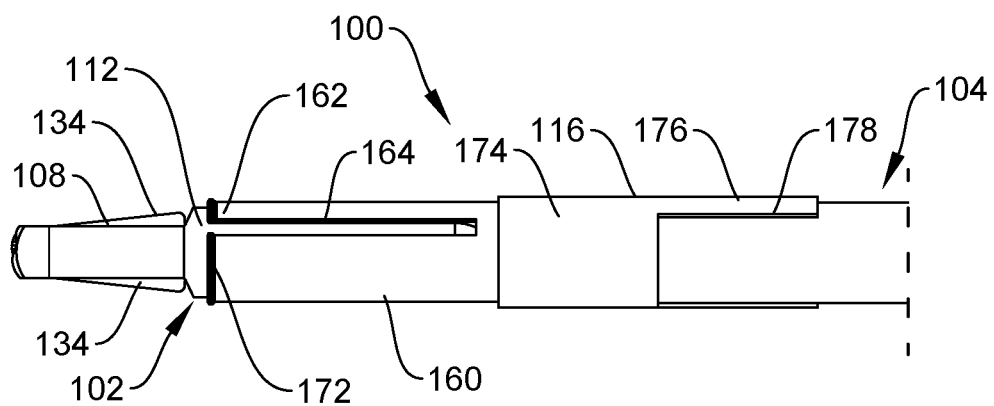
FIG. 4 shows a longitudinal side view of the system of FIG. 1, moving toward a deployed configuration.
Figure 5:
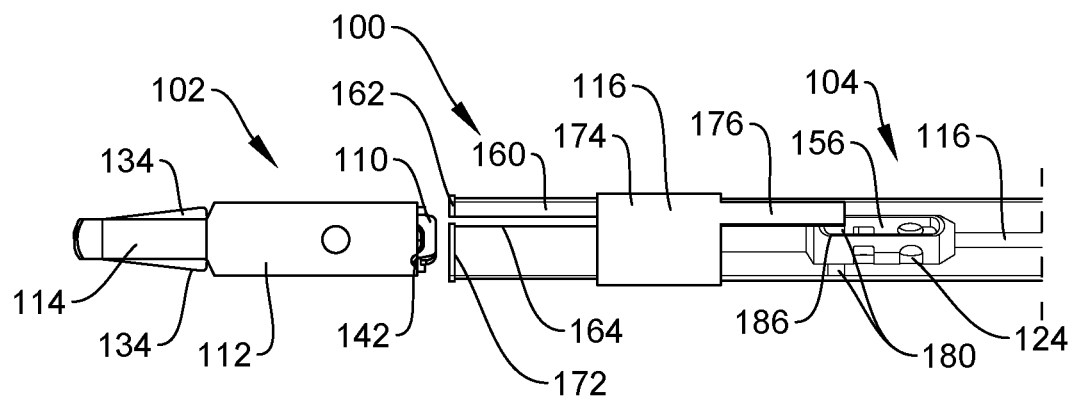
FIG. 5 shows a partially transparent longitudinal side view of the system of FIG. 1, in the deployed configuration.
Figure 6:
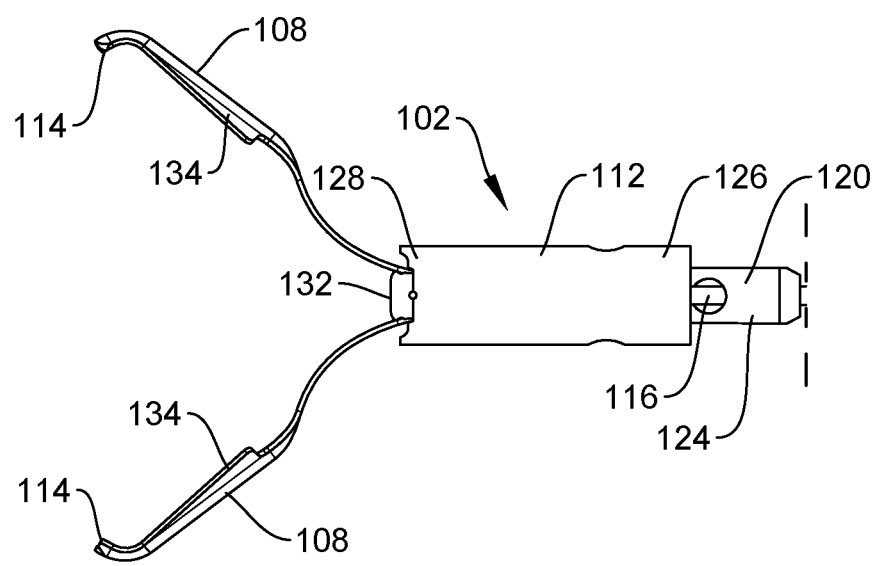
FIG. 6 shows a longitudinal side view of a clip, in an open configuration, according to the system of FIG. 1.
Figure 7:
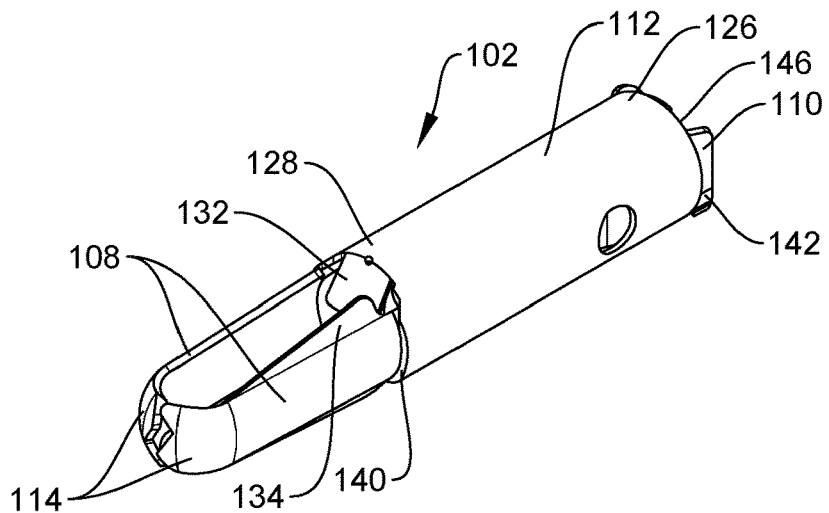
FIG. 7 shows a perspective view of the clip, in a closed configuration, according to the system of FIG. 1.
Figure 8:
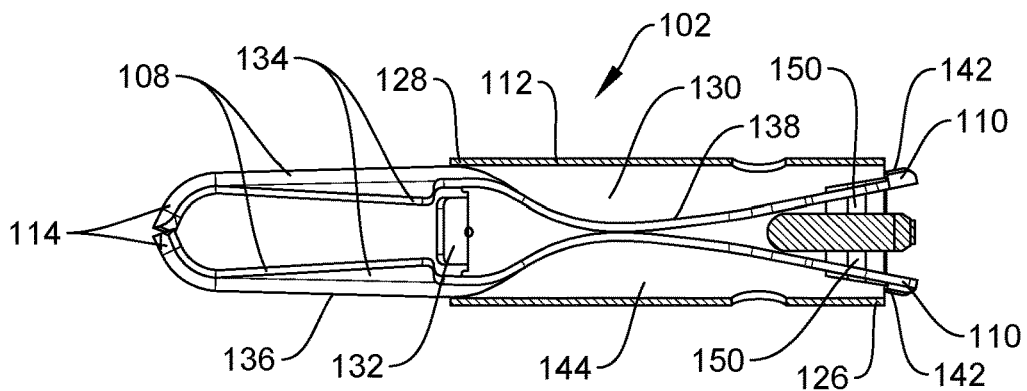
FIG. 8 shows a transparent longitudinal side view of the clip of FIG. 7.
Figure 9:
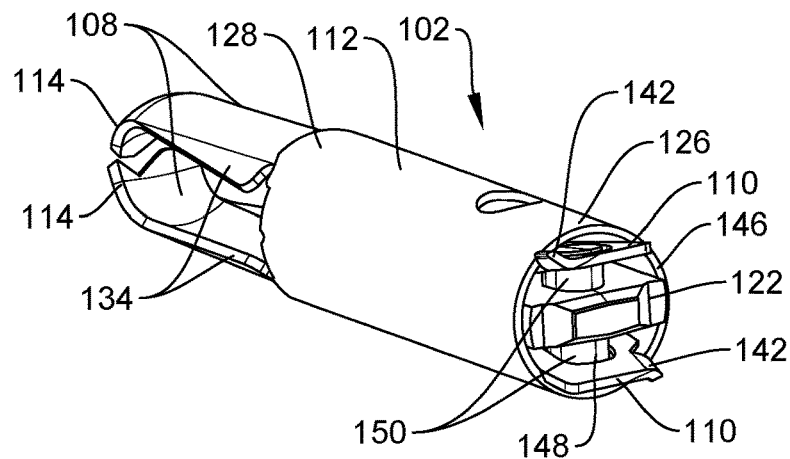
FIG. 9 shows another perspective view of the clip of FIG. 7.

FIGS. 1-9 show a clipping system 100 for treating tissue defects. The clipping system 100 comprises a clip 102 releasably coupled to a catheter 104 via a collet 106 slidably mounted over the catheter 104 to move the clipping system 100 between an insertion configuration, as shown in FIGS. 1-3, and a deployed configuration, as shown in FIGS. 4-5. The clip 102 includes a pair of clip arms 108, proximal ends 110 of which are slidably received within a capsule 112 so that the clip 102 may be moved between an open configuration, in which distal ends 114 of the clip arms 108 are separated from one another, and a closed configuration, in which the distal ends 114 are drawn toward one another. In an insertion configuration, the capsule 112 is received within a distal portion 160 of the catheter 104, the collet 106 positioned over the distal portion 160 to hold the capsule 112 therein.

Upon insertion of the clip 102 to a target site in a body, the clip 102 may be moved between the open and closed configuration via a control member 116 that extends from a distal end 118 coupled to the clip arms 108 to a proximal end extending proximally of a proximal end of the catheter 104 at which it is accessible to a user of the system 100 (e.g., surgeon). The control member 116 is connected to the clip arms 108 via a yoke 120 including a distal portion 122 connected to the clip arms 108 and a proximal portion 124 fixedly connected to the distal end 118 of the control member 116 and slidably connected to the collet 106. The distal and proximal portions 122, 124 of the yoke 120 are configured to break apart or otherwise separate from one another.

Thus, when tissue has been gripped via the clip arms 108, as desired, the clip 102 is deployed by drawing the control member 116 proximally relative to the catheter 104 until the clip arms 108 are locked with respect to the capsule 112, the proximal portion 124 of the yoke 120 is separated from the distal portion 122 of the yoke 120 and the collet 106 is drawn proximally relative to the catheter 104 so that the capsule 112 and the clip 102 are released from the proximal portion of the device which may then be withdrawn from the body while leaving the clip 102 in position within the body clipped to the target tissue.

As shown in FIGS. 6-9, the clip 102 includes the clip arms 108 and the capsule 112. The capsule 112 extends longitudinally from a proximal end 126 to a distal end 128 and includes a channel 130 extending therethrough. The distal end 128 of the capsule 112 in this embodiment includes a pair of capsule tabs 132 extending therefrom and bent radially inward into the channel 130. In one embodiment, the capsule tabs 132 are diametrically opposed from one another so that the capsule tabs 132 aid in alignment and positioning of the clip arms 108, as will be described in further detail below.

Each of the clip arms 108 extends from the proximal end 110 to the distal end 114. As described above, proximal portions of the clip arms 108 are slidably received within the channel 130. Specifically, the proximal end 110 of each of the clip arms 108 is slidably received within the channel 130 allowing the clip 102 to be moved between the open and closed configurations via manipulation of the control member 116. In one embodiment, the clip arms 108 are diametrically opposed to one another within the channel 130, extending along opposite sides of the capsule tabs 132.

In one embodiment, the clip arms 108 are biased toward the open configuration so that, when advanced distally out of the capsule 112, the clip arms 108 move apart form one another toward the open configuration under their natural bias. When the clip arms 108 are drawn proximally into the capsule 112, the clip arms 108 are constrained by a wall of the capsule 112 and drawn together toward the closed configuration in which the distal ends 114 are adjacent one another. Those skilled in the art will understand that any number of other mechanisms for opening and closing the clip arms 108 may be employed.

The clip arms 108 of this embodiment also include engaging features 134 extending therefrom. The engaging features are configured to engage a portion of the capsule 112 so that, when the engaging features 134 engage the capsule 112, the clip arms 108 are prevented from moving further proximally relative to the capsule. In one embodiment, the engaging features 134 extend laterally outward from a distal portion 136 of each of the clip arms 108 so that the distal portion 136 has a width greater than that of a proximal portion 138 of the clip arm 108 which is sized and shaped to permit the proximal portion 138 to be drawn proximally into the capsule 112.

Thus, as the clip arms 108 are drawn proximally into the capsule 112, the engaging features 134 abut the capsule tabs 132 and/or a distal face 140 of the capsule 112, preventing the distal portions 136 of the clip arms 108 from being drawn proximally into the capsule 112. The engaging features 134 are positioned along the clip arms 108 so that, at the point where the engaging features 134 have engaged the capsule 112, the clip arms 108 have been drawn sufficiently proximally into the capsule 112 to draw the clip arms 108 together into the closed configuration. In one example, the engaging features 134 are configured as wings extending laterally from longitudinal edges of the clip arms.

At least one of the proximal ends 110 of the clip arms 108 (in this embodiment, the proximal ends 110 of both of the clip arms 108 include a locking feature) includes a locking feature such as, for example, a locking tab 142 extending therefrom positioned and shaped to engage a corresponding locking portion of the capsule 112 when the clip 102 has been drawn proximally into the capsule 112 to a locking position. The proximal ends 110 of the clip arms 108, in this embodiment, are biased radially outward, away from a centerline of the capsule 112. Before the clip 102 is locked, the proximal ends 110 are restrained via an interior surface 144 of the capsule 112 so that the proximal ends 110 are slidable along the interior surface 144 of the channel 130 as the clip 102 is moved between the open and the closed configurations.

When the target tissue has been gripped via the clip arms 108 and it is desired to lock the clip arms 108 in the closed configuration, the clip arms 108 are drawn further proximally relative to the capsule 112 until the proximal ends 110 move proximally past the proximal end 126 of the capsule 112 so that the proximal ends 110 are no longer constrained via the capsule 112 and are freed to move radially away from one another under their natural bias. The locking tabs 142 thereby spring radially outward to engage a proximal edge 146 of the capsule 112 so that the clip arms 108 are prevented from moving distally relative to the capsule 112 and the clip arms 108 are held in the closed configuration. In this embodiment, a distance between the engaging features 134 and the locking tabs 142 of the clip arms 108 substantially corresponds to a length of the capsule 112.

In the locked configuration, the engaging features 134 engage the distal end of the capsule 112 while the locking tabs 142 extend proximally of the capsule 112, thereby locking the clip arms 108 relative to the capsule 112 in the closed configuration. In an exemplary embodiment, the proximal portion 138 of each of the clip arms 108 also includes an opening 148 extending therethrough. As will be described in further detail below, the opening 148 receives a portion of the yoke 120 therein so that the clip arms 108 are held in a desired alignment relative to one another and so that the clip arms 108 may be connected to the control member 116.

According to one example, the clip 102 has a rigid length of approximately 0.25 inches. As will be understood be understood by those of skill in the art, the clip 102 may have a shortened length relative to other standard hemostatic clips. In particular, since the clip 102 does not require a separate coupling joint for connecting the capsule 112 to the catheter 104 and because the clip arms 108 engage the proximal edge 146 of the capsule 112 rather than a locking structure along a length of the capsule 112, the capsule 112 may be reduced in length compared to conventional hemostatic clipping devices. In one example, the capsule 112 may be reduced in length by approximately 0.10 inches. It will be understood by those of skill in the art, however, that the clip 102 and capsule 112 may have any of a variety of lengths so long as the clip arms 108 are coupled to the control member 116 and the capsule 112 is configured to be received within the distal portion 160 of the catheter 104, as described in further detail below.

As described above, the clip arms 108 are connected to the control member 116 via the yoke 120. As shown in FIGS. 2, 3 and the yoke 120 includes the distal portion 122 and the proximal portion 124 connected to one another via a separable connection 152 which is configured to break, fail or otherwise separate when subjected to a predetermined force exceeding a threshold force. In one embodiment, the distal and proximal portions 122, 124 are connected to one another via a frangible link including, for example, a reduced diameter portion configured to break when the yoke 120 is subject to the predetermined force. In another embodiment, the distal and proximal portions 122, 124 are connected to one another via corresponding mating features which deform and release from one another when subject to the predetermined force. It will be understood by those of skill in the art, however, that the distal and proximal portions 122, 124 may be connected to one another via any of a number of connections so long as the distal and proximal portions 122, 124 are configured to separate from one another when subject to the predetermined force.

The distal portion 122 of the yoke 120 is received between the proximal ends 110 of the clip arms 108. The distal portion 122 of the yoke 120 includes a pair of protrusions 150 extending from opposing surfaces thereof so that each protrusion 150 is received within a corresponding one of the openings 148 of the clip arms 108 to maintain a desired alignment between the clip arms 108. Thus, each protrusion 150 is sized and shaped to correspond to a shape of the corresponding one of the openings 148.

The proximal portion 124 of the yoke 120 extends longitudinally and houses the distal end 118 of the control member 116 therein. In one embodiment, the control member 116 includes an enlarged distal end 118 received within a correspondingly sized and shaped recess 154 within the proximal portion 124 of the yoke 120. It will be understood by those of skill in the art, however, that the proximal portion 124 may be connected to the distal end 118 of the control member 116 in any of a number of ways so long as moving the control member 116 longitudinally relative to the catheter 104 and capsule 112 correspondingly moves the clip arms 108 to which the yoke 120 is connected and so that, upon separation of the proximal portion 124 of the yoke 120 from the distal portion 122, the control member 116 remains connected to the proximal portion 124.

According to an embodiment, the proximal portion 124 also includes a longitudinal groove 156 extending longitudinally along an exterior surface 158 of the proximal portion 124. The longitudinal groove 156 is configured to slidably receive a portion of the collet 106, as will be described in further detail below. In another embodiment, the proximal portion 124 includes a pair of longitudinal grooves 156 extending along opposing sides of the proximal portion 124. In yet another embodiment, the longitudinal grooves 156 extend laterally through the proximal portion 124 of the yoke 120 so that the longitudinal groove 156 receives portions of the collet 106 therein, from opposing sides of the yoke 120.

The clip 102, as described above, is releasably coupled to a catheter 104, as shown in FIGS. 1-5 (or to any other flexible insertion device) sized and configured for insertion through, for example, a working channel of an endoscope, to a target site within a body. The catheter 104 or other insertion device is, in one embodiment, sufficiently flexible to navigate through even tortuous paths of a body lumen as would be understood by those skilled in the art. The catheter 104 extends longitudinally from a distal end 162 to a proximal end which, when the clipping system 100 is in use and the clip 102 has been inserted to the target site, remains outside the body. The catheter 104 includes a channel 168 extending longitudinally therethrough.

The channel 168 is sized and shaped to receive the capsule 112 therein and a distal portion 160 of the catheter 104 includes a plurality of longitudinal slots 164 extending through a wall 166 thereof. The longitudinal slots 164 are open to the distal face 140 of the capsule 112 and in communication with the channel 168 so that the clip 102 may be received within the distal portion 160. The clip 102 is received substantially coaxially within the channel 168 so that a portion of the yoke 120 is received within the channel 168 and the control member 116 extends from the yoke 120, through the channel 168, to the proximal end which is accessible via a user of the system 100 (e.g., via any known actuator (not shown)). The distal end 162 of the catheter 104 includes a lip 172 extending about a perimeter thereof. The lip 172 acts as a stop which, as will be described in greater detail below, prevents the collet 106 from being moved distally therebeyond.

In one embodiment, the catheter 104 includes two longitudinal slots 164 extending along the distal portion 160. The longitudinal slots 164 of this embodiment extend through the wall 166 along opposing sides of the catheter 104. In another embodiment, the catheter 104 includes three longitudinal slots 164 extending along the distal portion 160. The longitudinal slots 164 are, in certain embodiments, equally circumferentially spaced from one another about a perimeter of the catheter 104. It will be understood by those of skill in the art that although the exemplary embodiments specifically show a catheter 104 including two or three longitudinal slots 164, the catheter 104 may include any number of longitudinal slots 164. It will also be understood by those of skill in the art that although the exemplary embodiments show and describe the longitudinal slots 164 equally spaced relative to one another, the catheter 104 may have any number of longitudinal slots 164 in any of a variety of configurations so long as the longitudinal slots 164 facilitate slidable insertion of the capsule 112 within the distal portion 160.

Proximally of the longitudinal slots 164, the catheter 104 includes an engaging slot 170 extending through the wall 166 along a portion of a length thereof. The engaging slot 170 is receives a portion of the collet 106 from an exterior of the capsule 112 into the channel 168 so that the collet 106 is slidably engaged with the longitudinal groove 156 of the proximal portion 124 of the yoke 120. In one embodiment, the catheter 104 includes one engaging slot 170. In another embodiment, the catheter 104 includes two engaging slots 170 with the engaging slots 170 extending through opposing portions of the catheter 104 and corresponding to the size and position of the longitudinal grooves 156 of the proximal portion 124 of the yoke 120.

The collet 106 is slidably mounted over the distal portion 160 of the catheter 104 for movement between the insertion configuration and the deployed configuration. In the insertion configuration, as shown in FIGS. 1-3, the collet 106 is positioned over the distal portion 160 of the catheter 104 so that the distal portion 160 is pressed against the capsule 112, holding the capsule 112, and thereby the clip 102, therein. It will be understood by those of skill in the art that the collet 106 may be mounted over the distal portion 160 and held in position thereover via a friction fit. In the insertion configuration, the collet 106 of this embodiment abuts the lip 172 at the distal end 162 of the catheter 104 so that the collet 106 is prevented from moving distally past the distal end 162 of the catheter 104 and thus does not interfere with the opening and closing of the clip arms 108. When moving toward the deployed configuration, as shown in FIGS. 4-5, the collet 106 is moved proximally along the catheter 104 until the collet 106 is proximal of the longitudinal slots 164 thereof. In the deployed configuration, the distal portion 160 of the catheter 104 is no longer pressed against the capsule 112 freeing the clip 102 to be released from therefrom.

As will be understood by those of skill in the art, as the collet 106 is moved over the distal portion 160 toward the insertion configuration, a width of the longitudinal slots 164 (i.e., a distance between longitudinal sides of the longitudinal slots 164) is reduced so that the inner diameter of the distal portion 160 is reduced and the catheter 104 is held firmly against the capsule 112 retaining the capsule 112 and the clip 102 within the catheter 104. As the collet 106 is moved toward the deployed configuration, the with of the longitudinal slots 164 is permitted to widen so that the distal portion 160 is no longer pressed firmly against the capsule 112. Thus, the clip 102 may be released from the catheter 104 by drawing the catheter 104 proximally away from the clip 102.

The collet 106 of this embodiment includes a ring portion 174 sized and shaped to extend about the catheter 104 and a pair of fingers 176 extending proximally therefrom to extend longitudinally along portion of the catheter 104. At a proximal end 178 of each of the fingers 176, the collet 106 includes an engaging tab 180 extending radially inward. Each of the engaging tab 180s is configured to be extend through a corresponding one of the engaging slots 170 to be received within a corresponding one of the longitudinal grooves 156 of the proximal portion 124. Each engaging tab 180 is longitudinally slidable within the corresponding longitudinal groove 156 to permit movement of the clip 102 between the open and closed configurations while the clipping system 100 is in the insertion configuration.

In particular, while the collet 106 remains stationary over the catheter 104 and the control member 116 is moved distally and proximally relative to the catheter 104 to move the clip 102 between the open and the closed configuration, respectively, the yoke 120 slides along the engaging tab 180 via the longitudinal groove 156. Thus, a length of the longitudinal groove 156 corresponds to a range over which the control member 116 may be moved relative to the catheter 104 as the clip 102 is moved between the open and the closed configurations.

Once it is determined that the clip 102 has been closed over target tissue as desired, the control member 116 is drawn proximally relative to the catheter 104 until the engaging tabs 180 engages a distal end 186 of the longitudinal groove 156. At this point, when the control member 116 is moved further proximally relative to the catheter 104, the collet 106 is also drawn proximally relative to the catheter 104 toward the deployed configuration. As the collet 106 is moved proximally along the catheter 104, the engaging tab 180 of each of the fingers 176 slides proximally through the corresponding one of the engaging slots 170. It will be understood by those of skill in the art that although the exemplary embodiments show and describe the collet 106 as including two fingers 176, the collet 106 may include any number of fingers 176 (and so long as the number of fingers 176 and engaging tabs 180 correspond to then number of longitudinal grooves 156 along the proximal portion 124 of the yoke 120.

Figure 10:
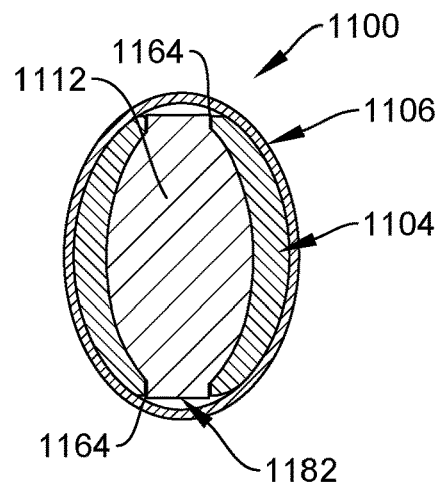
FIG. 10 shows a lateral cross-sectional view of a clipping system according to an exemplary embodiment.

According to another exemplary embodiment, as shown in FIG. 10, a system 1100 is substantially similar to the system 100 including all of the features the system as described above except for the differences discussed below. A capsule 1112, catheter 1104 and collet 1106 of the system 1100 are in this embodiment substantially similar to system 100 described above. The capsule 1112 and the catheter 1104, however, may be correspondingly sized and shaped so that, when a portion of the capsule 1112 is received within longitudinal slots 1164, torque may be transferred from the catheter 1104 to the clip 1102 so that rotation of the catheter 1104 to the clip 1102. In one example, the capsule 1112, catheter 1104 and the collet 1106 have a substantially oval cross-sectional shape. In another example, the capsule 1112 includes features 1182 keyed to the longitudinal slots 1164 so that the capsule 1112 is prevented from being rotated relative to the catheter 1104. Thus, a torsional force applied to the catheter 1104 (e.g., via rotation of the catheter 1104) is transferred to the clip 1102.

Figure 11:
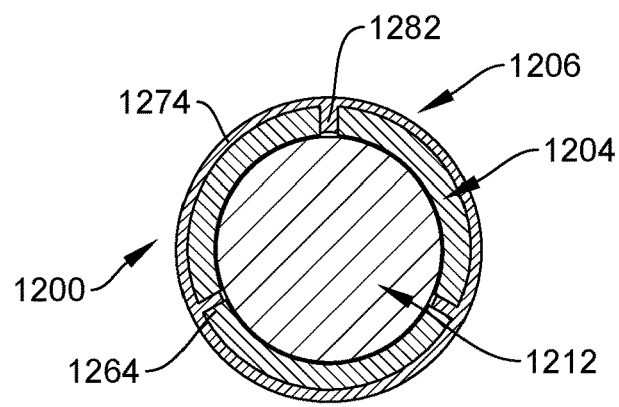
FIG. 11 shows a lateral cross-sectional view of a clipping system according to yet another exemplary embodiment.

In another exemplary embodiment, as shown in FIG. 11, a ring portion 1274 of a collet 1206 according to a system 1200 includes key features 1282 received within the longitudinal slots 1264 of a catheter 1204 so that, a rotation of the catheter 1204 correspondingly rotates the collet 1206 and a capsule 1212. In one embodiment, the key feature 1282 is configured as a protrusion extending radially inward from an interior surface of the ring portion 1274 along a length thereof. It will be understood by those of skill in the art, however, that the embodiments shown in FIGS. 10 and 11 are exemplary only and that there are any number of ways for the catheter 104 to be keyed to the clip 102 and/or collet 106 so that a rotation of the catheter 104 provides a torque transfer to the clip 102.

According to an exemplary method utilizing the system 100, the clip 102 is inserted through, for example, a working channel of an endoscope to a target site within a body. In the insertion configuration, the clip 102 remains coupled to the catheter 104 via the collet 106. The clip 102 is inserted into the body via the catheter 104, in the closed configuration, so that a proximal end of the catheter 104 remains exterior to the body. Once the clip 102 has reached the target site, the user advances the control member 116 distally to advance the clip arms 108 distally out of the capsule 112, freeing the clip arms 108 to move under their natural bias toward the open configuration so that target tissue may be received between the clip arms 108.

The user may then operate the control member 116 to move the clip 102 between the open and closed configurations, as desired, until a target portion of tissue is positioned between the clip arms 108 as desired. The user then draws the control member 116 proximally (or advances the catheter 104 distally over the control member 116) so that, as the clip arms 108 are drawn into the capsule 112, the clip arms 108 are drawn toward one another to grip the target tissue between the distal ends 114 of the clip arms 108. As described above, while the clip 102 is being moved between the open and closed configurations, the engaging tabs 180 of the collet 106 slide within the longitudinal grooves 156 along the proximal portion 124 of the yoke 120.

When the user is satisfied that the clip 102 is in a desired position gripping the target tissue, the user draws the control member 116 proximally relative to the catheter 104 until the locking tabs 142 at the proximal ends 110 of the clip arms 108 are moved proximally of the proximal end 126 of the capsule 112. Once the proximal ends 110 are no longer restrained via the interior surface 144 of the capsule 112, the proximal ends 110 spring outward away from the centerline of the capsule 112 so that the locking tabs 142 engage the proximal edge 146 of the capsule 112 locking the clip arms 108 closed over the target tissue. The user continues to draw the control member 116 proximally until the engaging features 134 engage the capsule tabs 132 and/or the distal face 140 of the capsule 112 and a predetermined force is exerted on the separable connection 152 of the yoke 120. When this predetermined force is met or exceeded, the separable connection 152 breaks or otherwise releases so that the proximal portion 124 of the yoke 120 is separated from the distal portion 122 of the yoke 120. Thus, the distal portion 122 remains within the capsule 112, and the clip 102 is locked in the closed configuration while the proximal portion 124 is draw proximally away from the clip 102.

The user then operates the actuator to move the control member 116 proximally relative to the catheter 104 so that the proximal portion 124 of the yoke 120 is correspondingly moved proximally relative to the catheter 104 until the distal end 186 of the longitudinal groove 156 engages the engaging tabs 180 of collet 106. At this point, continued proximal movement of the control member 116 draws the collet 106 proximally relative to the catheter 104, moving the collet 106 from the insertion configuration toward the deployed configuration. As the collet 106 is moved toward the deployed configuration, as shown in FIG. 4, the engaging tabs 180 of the collet 106 side along the engaging slots 170 of the catheter 104.

When the collet 106 reaches the deployed configuration, the distal portion 160 of the catheter 104 expands and the capsule 112 is no longer held frictionally within the distal portion 160 of the catheter 104. Thus, drawing the catheter 104 proximally relative to the clip 102 moves the catheter 104 proximally away from the clip 102 as shown in FIG. 5. Thus, the clip 102 may remain in position clipped to the target tissue as the catheter 104 is withdrawn from the body. In a further embodiment, upon release of the clip 102 from the catheter 104 and removal of the catheter 104 from the body, the catheter 104 may be reloaded with a new clip 102 so that additional clips 102 may be placed within the body to treat the target site.

Figure 12:
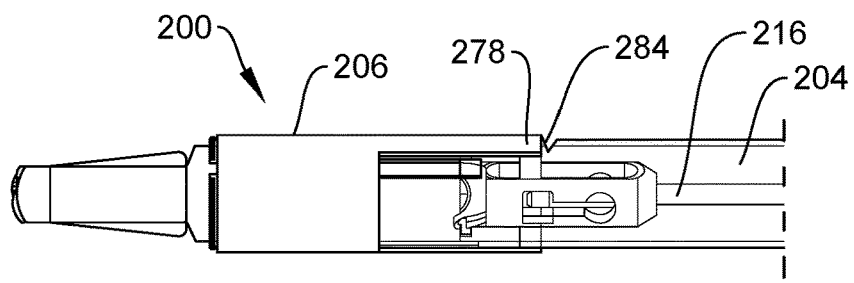
FIG. 12 shows a partially transparent longitudinal side view of a system according to a further embodiment of the present disclosure.

According to a further exemplary embodiment, as shown in FIG. 12, a system 200 is substantially similar to the system 100 described above excepted as noted below. The catheter 204 further includes a crimp tab 284 crimped through a wall of a catheter 204 in a position along the catheter 204 immediately proximal of a proximal end 278 of a collet 206, when the collet 206 is in the insertion configuration. The crimp tab 284 acts as a stop which prevents the collet 206 from being inadvertently moved from the insertion configuration toward the deployed configuration.

The crimp tab 284, however, is deformable and, in this embodiment, is configured to deform when subject to a proximally directed force of at least a predetermined magnitude. Thus, when it is desired to move the system 200 toward the deployed configuration, the control member 216 is drawn proximally relative to the catheter 204 until the collet 206 is pressed proximally against the crimp tab 284 via a force sufficient to deform the crimp tab 284. The collet 206 deforms the crimp tab 284 as it moves proximally therebeyond toward the deployed configuration.

It will be apparent to those skilled in the art that various modifications may be made in the present disclosure, without departing from the scope of the disclosure. Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

What is claimed is:

1. A clipping system for treating tissue, comprising:
an insertion device extending longitudinally from a proximal end to a distal end and including a channel extending therethrough, the insertion device including a plurality of longitudinal slots extending through a wall thereof and along a distal portion thereof such that the longitudinal slots are open to the channel and the distal end of the insertion device;
a clip releasably received within the distal portion of the insertion device, the clip including a capsule extending longitudinally from a proximal end to a distal end and including a channel extending therethrough, and a pair of clip arms, proximal ends of which are slidably received within the channel of the capsule to move the clip arms between an open configuration, in which distal ends thereof are separated from one another to receive a tissue therebetween, and a closed configuration, in which the distal ends are drawn toward one another to grip tissue there between;

a collet slidably mounted over the insertion device and movable between an insertion configuration, in which the collet is positioned over the distal portion of the insertion device to press the distal portion against the capsule and to hold the capsule therein, and a deployed configuration, in which the collet is proximal of the distal portion so that the clip is releasable from the distal portion of the insertion device; and a control member extending through the channel of the insertion device to be coupled to the proximal ends of the clip arms and a portion of the collet so that movement of the clip between the open and closed configurations and movement of the collet between the insertion configuration and the deployed configuration is controlled via a longitudinal movement of the control member relative to the insertion device.

2. The system of claim 1, further comprising a yoke coupling the control member to the clip arms and the collet, the yoke including a distal portion connected to the clip arms and a proximal portion connected to a portion of the collet, the distal and proximal portions of the yoke connected to one another via a separable connection that is configured to separate when subject to a predetermined force exceeding a predetermined threshold value.

3. The system of claim 2, wherein the distal portion is received between the proximal ends of the clip arms and includes protrusions extending from opposing sides thereof, the protrusions received within openings extending through a proximal portion of the clip arms.

4. The system of claim 2, wherein the proximal portion houses a distal end of the control member therein and includes a longitudinal groove extending therealong, an engaging tab of the collet extending into the channel of the insertion device to be slidably received within the longitudinal groove.

5. The system of claim 4, wherein a length of the longitudinal groove corresponds to a distance via which the control member is moved relative to the insertion device during a movement of the clip between the open and the closed configurations.

6. The system of claim 2, wherein the clip arms include engaging features configured to engage a portion of the capsule such that, when the engaging features engage the capsule, the clip arms are prevented from moving further proximally relative to capsule and the predetermined force is exerted on the distal end of the control member.

7. The system of claim 1, wherein the proximal ends of the clip arms are biased radially outward and include locking structures extending laterally therefrom so that, when the proximal ends of the clip arms are moved proximally of the proximal end of the capsule, the locking structures engage a proximal edge of the capsule to lock the clip in the closed configuration.

8. The system of claim 1, wherein the distal ends of the clip arms are biased toward the open configuration so that, when the clip arms are drawn into the capsule, the clip arms are constrained toward the closed configuration via an interior surface of the capsule and, when the clip arms are moved distally out of the capsule, the clip arms are permitted to revert to their biased open configuration.

9. The system of claim 1, wherein the capsule is keyed to the insertion device so that a rotation of the insertion device correspondingly rotates the clip.

10. The system of claim 1, wherein the insertion device is keyed to the collet so that a rotation of the insertion device correspondingly rotates the collet and the clip.

11. The system of claim 1, wherein the insertion device further includes a crimp tab positioned immediately distal a proximal end of the collet when the collet is in the insertion configuration and extending into the channel of the insertion device, the crimp tab deformable to permit the collet to move proximally therepast when subject to a predetermined force exceeding a predetermined threshold value via the collet.

12. A clipping system, comprising:
a catheter extending longitudinally from a proximal end to a distal end and including a channel extending therethrough, the catheter including a plurality of longitudinal slots extending through a wall thereof from the distal end along a distal portion of the catheter;

a clip including a capsule extending longitudinally from a proximal end to a distal end and including a channel extending therethrough, and a pair of clip arms, proximal ends of which are slidably received within the channel of the capsule to move the clip arms between an open configuration and a closed configuration, the capsule of the clip configured to be releasably received within the distal portion of the catheter;

a collet slidably mounted over the catheter and movable between an insertion configuration, in which the collet is positioned over the distal portion of the catheter to press the distal portion against the capsule to hold the capsule therein, and a deployed configuration, in which the collet is proximal the distal portion so that the clip is releasable from the distal portion of the catheter; and a control member connected to the clip arms and the collet via a yoke, the yoke including a distal portion connected to the clip arms and a proximal portion connected to a portion of the collet, the distal and proximal portions of the yoke connected to one another via a separable connection that is configured to separate when subject to a predetermined force exceeding a predetermined threshold value.

13. The system of claim 12, wherein the proximal portion houses an enlarged distal end of the control member therein and includes a longitudinal groove extending therealong, an engaging tab of the collet extending into the channel of the insertion catheter to be slidably received within the longitudinal groove.

14. The system of claim 12, wherein the proximal ends of the clip arms are biased radially outward and include locking structures extending laterally therefrom so that, when the proximal ends of the clip arms are moved proximally of the proximal end of the capsule, the locking structures engage a proximal edge of the capsule to lock the clip in the closed configuration.

15. The system of claim 12, wherein the clip arms include engaging features configured to engage portion of the capsule such that, when the engaging features engage the capsule, the clip arms are prevented from moving further proximally relative to capsule and the predetermined force is exerted on the distal end of the control member.

* * * * *